United States Patent
Kawata et al.

(10) Patent No.: US 11,462,842 B2
(45) Date of Patent: Oct. 4, 2022

(54) WIRE CONNECTION STRUCTURE AND WIRE CONNECTION METHOD

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuji Kawata, Mie (JP); Kenji Miyamoto, Mie (JP); Daichi Shirai, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/054,287

(22) PCT Filed: May 17, 2019

(86) PCT No.: PCT/JP2019/019629
§ 371 (c)(1),
(2) Date: Nov. 10, 2020

(87) PCT Pub. No.: WO2019/225492
PCT Pub. Date: Nov. 28, 2019

(65) Prior Publication Data
US 2021/0184376 A1    Jun. 17, 2021

(30) Foreign Application Priority Data
May 24, 2018    (JP) .............................. JP2018-099503

(51) Int. Cl.
*H01R 4/00* (2006.01)
*H01R 4/62* (2006.01)
(Continued)

(52) U.S. Cl.
CPC ............... *H01R 4/625* (2013.01); *H01B 1/02* (2013.01); *H01R 4/021* (2013.01);
(Continued)

(58) Field of Classification Search
CPC ....................................................... H01R 4/00
See application file for complete search history.

(56) References Cited

U.S. PATENT DOCUMENTS 8,931,685 B2    1/2015  Kataoka
9,505,083 B2 *  11/2016  Ruhl ...................... B23K 20/10
(Continued)

FOREIGN PATENT DOCUMENTS

JP    2005-322544 A    11/2005
JP    2007-185706 A    7/2007
(Continued)

OTHER PUBLICATIONS

International Search Report dated Jun. 18, 2019 for WO 2019/225492 A1 (4 pages).

*Primary Examiner* — Chau N Nguyen
(74) *Attorney, Agent, or Firm* — Venjuris, P.C.

(57) ABSTRACT

A harness is provided with one or more first wires each including a first core exposed portion, one or more second wires each including a second core exposed portion, and a bonded portion formed by welding the first and second core exposed portion(s). A total cross-sectional area of the second core(s) is equal to or less than ⅓ of the sum of total cross-sectional areas of the first and second core(s). The bonded portion has two pairs of outer surfaces extending along an extending direction of the first and second wires (Continued)

and facing each other and a distance H between one pair of the outer surfaces (upper/lower surfaces), out of the two pairs of outer surfaces, is longer than a distance W between another pair of the outer surfaces (right/left side surfaces). The second core exposed portion(s) is/are arranged adjacent to the upper surface Up in the bonded portion.

9 Claims, 6 Drawing Sheets

(51) Int. Cl.
*H01B 1/02* (2006.01)
*H01R 4/02* (2006.01)
*H01R 43/02* (2006.01)
*H02G 1/14* (2006.01)
*H02G 15/02* (2006.01)

(52) U.S. Cl.
CPC ........... *H01R 43/0207* (2013.01); *H02G 1/14* (2013.01); *H02G 15/02* (2013.01)

(56) References Cited

U.S. PATENT DOCUMENTS

2004/0134062 A1* 7/2004 Jonli ...................... H01R 4/029
29/872
2012/0318554 A1 12/2012 Koto

FOREIGN PATENT DOCUMENTS

| | | | |
|---|---|---|---|
| JP | 2011-014438 | A | 1/2011 |
| JP | 2013-235671 | A | 11/2013 |
| JP | 2013-242991 | A | 12/2013 |
| JP | 2017-126520 | A | 7/2017 |
| JP | 2017-168400 | A | 9/2017 |

* cited by examiner

WIRE CONNECTION STRUCTURE AND WIRE CONNECTION METHOD

CROSS REFERENCE TO RELATED APPLICATIONS

This application is a national phase of PCT application No. PCT/JP2019/019629, filed on 17 May 2019, which claims priority from Japanese patent application No. 2018-099503, filed on 24 May 2018, all of which are incorporated herein by reference.

TECHNICAL FIELD

A technique disclosed by this specification relates to a wire connection structure and a wire connection method.

BACKGROUND

There is known a wire connection structure in which cores of a plurality of wires are bonded. A method for bundling and twisting cores of a plurality of wires and bonding the cores by ultrasonic welding (see Patent Document 1) is, for example, known as a core bonding method.

PRIOR ART DOCUMENT

Patent Document

Patent Document 1: JP 2005-322544A

SUMMARY OF THE INVENTION

Problems to be Solved

With the bonding method as described above, in the case of bonding two types of wires different in core material, bonding strength is not sufficient and problems such as the peeling of a bonded part may occur. Thus, there has been a demand for improvement.

Means to Solve the Problem

A wire connection structure disclosed by this specification is provided with one or more first wires each including a first core and a first insulation coating covering the first core and having a first core exposed portion formed by partially exposing the first core from the first insulation coating, one or more second wires each including a second core made of a material different from that of the first core and a second insulation coating covering the second core and having a second core exposed portion formed by partially exposing the second core from the second insulation coating, and a bonded portion formed by welding the first core exposed portion(s) and the second core exposed portion(s), wherein a total cross-sectional area of the second core(s) is equal to or less than ⅓ of the sum of total cross-sectional areas of the first core(s) and the second core(s), the bonded portion has two pairs of outer surfaces extending along an extending direction of the first and second wires and facing each other and a distance between one pair of the outer surfaces, out of the two pairs of outer surfaces, is longer than a distance between another pair of the outer surfaces, and the second core exposed portion(s) is/are arranged adjacent to one outer surface, out of the one pair of outer surfaces, in the bonded portions.

Further, a wire connection method disclosed by this specification is a method for connecting one or more first wires each including a first core and a first insulation coating covering the first core and one or more second wires each including a second core made of a material different from that of the first core and a second insulation coating covering the second core, a total cross-sectional area of the second core(s) being equal to or less than ⅓ of the sum of total cross-sectional areas of the first core(s) and the second core(s), the method including an exposing step of stripping the first insulation coating and the second insulation coating in parts of each first wire and each second core to expose the first core and the second core, and a welding step of ultrasonically welding parts of the first core(s) and the second core(s) exposed in the exposing step to form a bonded portion by an ultrasonic welding machine including a welding horn and a receiving jig, wherein, in the welding step, welding is performed with the first core(s) held in contact with the receiving jig and the second core(s) held in contact with the welding horn, and a distance between a first contact surface in contact with the receiving jig and a second contact surface in contact with the welding horn is longer than a distance between one pair of outer surfaces different from the first and second contact surfaces in the bonded portion.

Effect of the Invention

According to the wire connection structure and the wire connection method disclosed by this specification, it is possible to suppress the peeling of a bonded part.

DETAILED DESCRIPTION TO EXECUTE THE INVENTION

Summary of Embodiments

Figure 1:
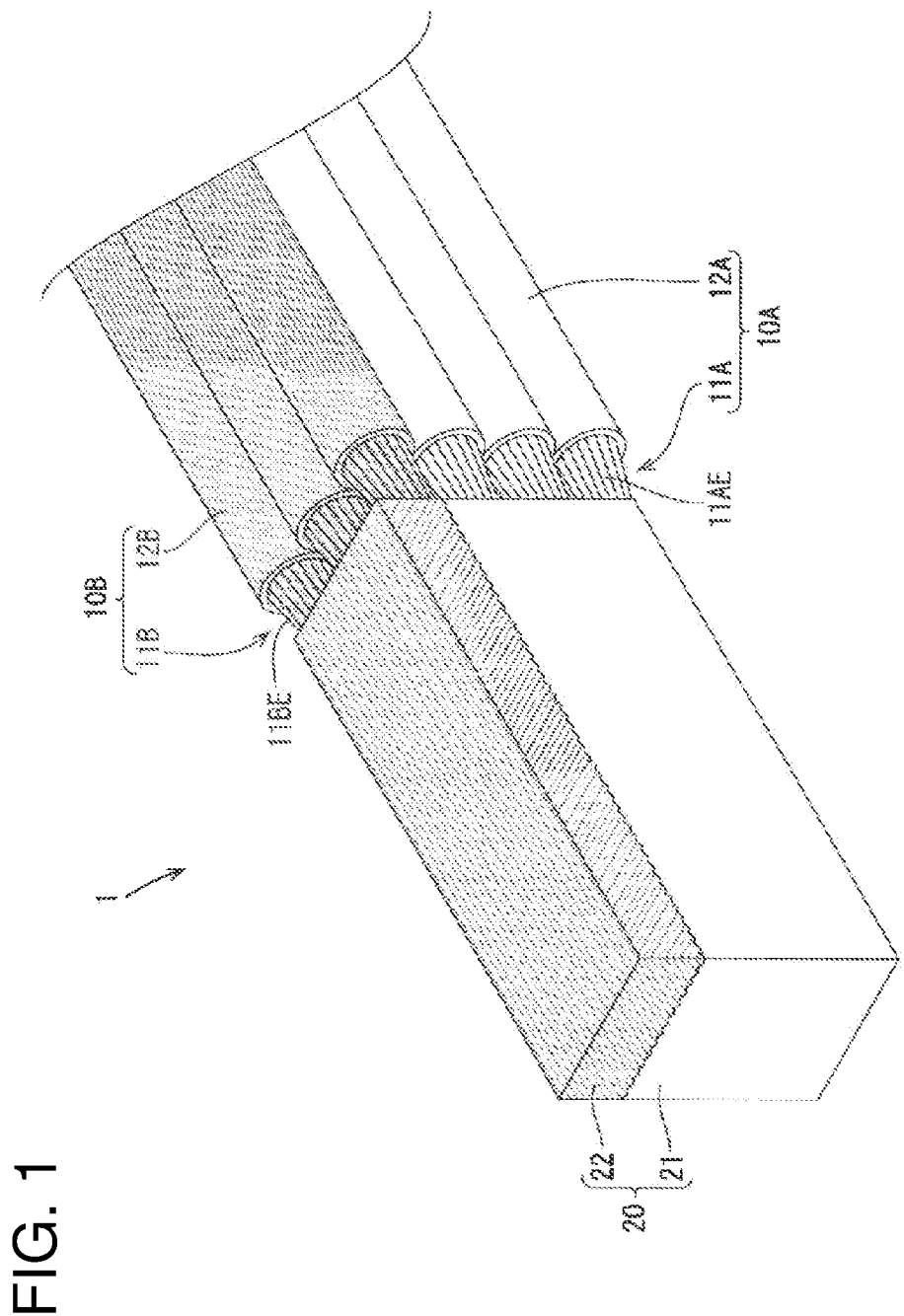
FIG. 1 is a perspective view of a harness of an embodiment.

A wire connection structure disclosed by this specification is provided with one or more first wires each including a first core and a first insulation coating covering the first core and having a first core exposed portion formed by partially exposing the first core from the first insulation coating, one or more second wires each including a second core made of a material different from that of the first core and a second insulation coating covering the second core and having a second core exposed portion formed by partially exposing the second core from the second insulation coating, and a bonded portion formed by welding the first core exposed portion(s) and the second core exposed portion(s), wherein a total cross-sectional area of the second core(s) is equal to or less than ⅓ of the sum of total cross-sectional areas of the first core(s) and the second core(s), the bonded portion has two pairs of outer surfaces extending along an extending direction of the first and second wires and facing each other and a distance between one pair of the outer surfaces, out of the two pairs of outer surfaces, is longer than a distance between another pair of the outer surfaces, and the second core exposed portion(s) is/are arranged adjacent to one outer surface, out of the one pair of outer surfaces, in the bonded portions.

Further, a wire connection method disclosed by this specification is a method for connecting one or more first wires each including a first core and a first insulation coating covering the first core and one or more second wires each including a second core made of a material different from that of the first core and a second insulation coating covering the second core, a total cross-sectional area of the second core(s) being equal to or less than ⅓ of the sum of total cross-sectional areas of the first core(s) and the second core(s), the method including an exposing step of stripping the first insulation coating and the second insulation coating in parts of each first wire and each second wire to expose the first core and the second core, and a welding step of ultrasonically welding parts of the first core(s) and the second core(s) exposed in the exposing step to form a bonded portion by an ultrasonic welding machine including a welding horn and a receiving jig, wherein, in the welding step, welding is performed with the first core(s) held in contact with the receiving jig and the second core(s) held in contact with the welding horn, and a distance between a first contact surface in contact with the receiving jig and a second contact surface in contact with the welding horn is longer than a distance between one pair of outer surfaces different from the first and second contact surfaces in the bonded portion.

In the wire connection structure and the wire connection method disclosed by this specification, the "total cross-sectional area of the first core(s)" is a cross-sectional area of one first core provided in one first wire if there is one first wire, and is a total of cross-sectional areas of a plurality of first cores provided in a plurality of first wires if there are the plurality of first wires. Similarly, the "total cross-sectional area of the second core(s)" is a cross-sectional area of one second core provided in one second wire if there is one second wire, and is a total of cross-sectional areas of a plurality of second cores provided in a plurality of second wires if there are the plurality of second wires.

Further, in the wire connection structure disclosed by this specification, "the second core exposed portion(s) is/are arranged adjacent to one outer surface, out of the one pair of outer surfaces, in the bonded portions" means that one second core exposed portion provided in one second wire is arranged adjacent to the one outer surface if there is one second wire, and means that a bundle of a plurality of the second core exposed portions provided in a plurality of the second wires is arranged adjacent to the one outer surface if there are the plurality of second wires.

Further, in the wire connection method disclosed by this specification, "the first core(s) held in contact with the receiving jig" means that one first core provided in one first wire is in contact with the receiving jig if there is one first wire, and means that a bundle of a plurality of the first cores provided in a plurality of the first wires is in contact with the receiving jig if there are the plurality of first wires. Similarly, "the second core(s) held in contact with the welding horn" means that one second core provided in one second wire is in contact with the welding horn if there is one first wire, and means that a bundle of a plurality of the second cores provided in a plurality of the second wires is in contact with the welding horn if there are the plurality of second wires.

According to the above configuration, the second core exposed portion(s) is/are arranged adjacent to the one outer surface, out of the one pair of outer surfaces of the bonded portion. Here, since the distance between the one pair of outer surfaces, out of the two pairs of outer surfaces, is longer than the distance between the other pair of outer surfaces in the bonded portion, a width of each of the one pair of outer surfaces is shorter than a width of each of the other pair of outer surfaces. If the second core exposed portion(s) having a smaller total cross-sectional area is/are arranged adjacent to either one of the other pair of outer surfaces (outer surfaces having a wider width), the arrangement of the second core exposed portion(s) changes at every welding and a variation of welding strength becomes larger. In contrast, by arranging the second core exposed portion(s) having a smaller total cross-sectional area adjacent to either one of the one pair of outer surfaces (outer surfaces having a narrower width), the variation of welding strength can be reduced and the peeling of a bonded part can be suppressed.

In the above configuration, either one(s) of the first core(s) and the second core(s) may be made of aluminum or aluminum alloy. Further, the other(s) of the first core(s) and the second core(s) may be made of copper or copper alloy.

In the above configuration, the bonded portion may include a first layer constituted by the first core exposed portion(s) and a second layer adjacent to the first layer and constituted by the second core exposed portion(s).

Here, "the first layer constituted by the first core exposed portion(s)" means that the first layer is constituted by one first core exposed portion provided in one first wire if there is one first wire, and means that the first layer is constituted by a bundle of a plurality of the first core exposed portions provided in a plurality of first wires if there are the plurality of first wires. Similarly, "the second layer constituted by the second core exposed portion(s)" means that the second layer is constituted by one second core exposed portion provided in one second wire if there is one second wire, and means that the second layer is constituted by a bundle of a plurality of the second core exposed portions provided in a plurality of second wires if there are the plurality of second wires.

As just described, if a part constituted by the first core exposed portion(s) and a part constituted by the second core exposed portion(s) are divided into two layers in the bonded portion, the variation of welding strength can be further suppressed and the peeling of the bonded part can be suppressed as compared to the case where the part constituted by the first core exposed portion(s) and the part constituted by the second core exposed portion(s) are not completely divided into two layers.

DETAILS OF EMBODIMENT

A specific example of the technique disclosed by this specification is described below with reference to the drawings. Note that the present invention is not limited to these illustrations and is intended to be represented by claims and include all changes in the scope of claims and in the meaning and scope of equivalents.

Embodiment

An embodiment is described with reference to FIGS. 1 to 4. A wire connection structure of this embodiment is a part of a harness 1 in which a plurality of wires 10A, 10B are connected. As shown in FIG. 1, the harness 1 includes a plurality of first wires 10A and a plurality of second wires 10B.

As shown in FIG. 1, the first wire 10A is an aluminum wire having a known configuration and including a first core 11A configured by a stranded wire formed by stranding a plurality of strands made of aluminum or aluminum alloy and a first insulation coating 12A made of synthetic resin and covering the first core 11A. The first core 11A includes a part (first core exposed portion 11AE) exposed from the first insulation coating 12A in an end part of the first wire 10A.

As shown in FIG. 1, the second wire 10B is a copper wire having a known configuration and including a second core 11B configured by a stranded wire formed by stranding a plurality of strands made of copper or copper alloy and a second insulation coating 12B made of synthetic resin and covering the second core 11B. The second core 11B includes a part (second core exposed portion 11BE) exposed from the second insulation coating 12B in an end part of the second wire 10B.

In this embodiment, a total cross-sectional area A2 of the second cores 11B (a total of cross-sectional areas of the second cores 11B of the plurality of second wires 10B) is smaller than a total cross-sectional area A1 of the first cores 11A (a total of cross-sectional areas of the first cores 11A of the plurality of first wires 10A). More specifically, the total cross-sectional area A2 of the second cores 11B is equal to or less than ⅓ of the sum (A1+A2) of the total cross-sectional areas of the first cores 11A and the second cores 11B.

A plurality of the first core exposed portions 11AE and a plurality of the second core exposed portions 11BE are welded in a bundled state by ultrasonic welding.

Figure 3:
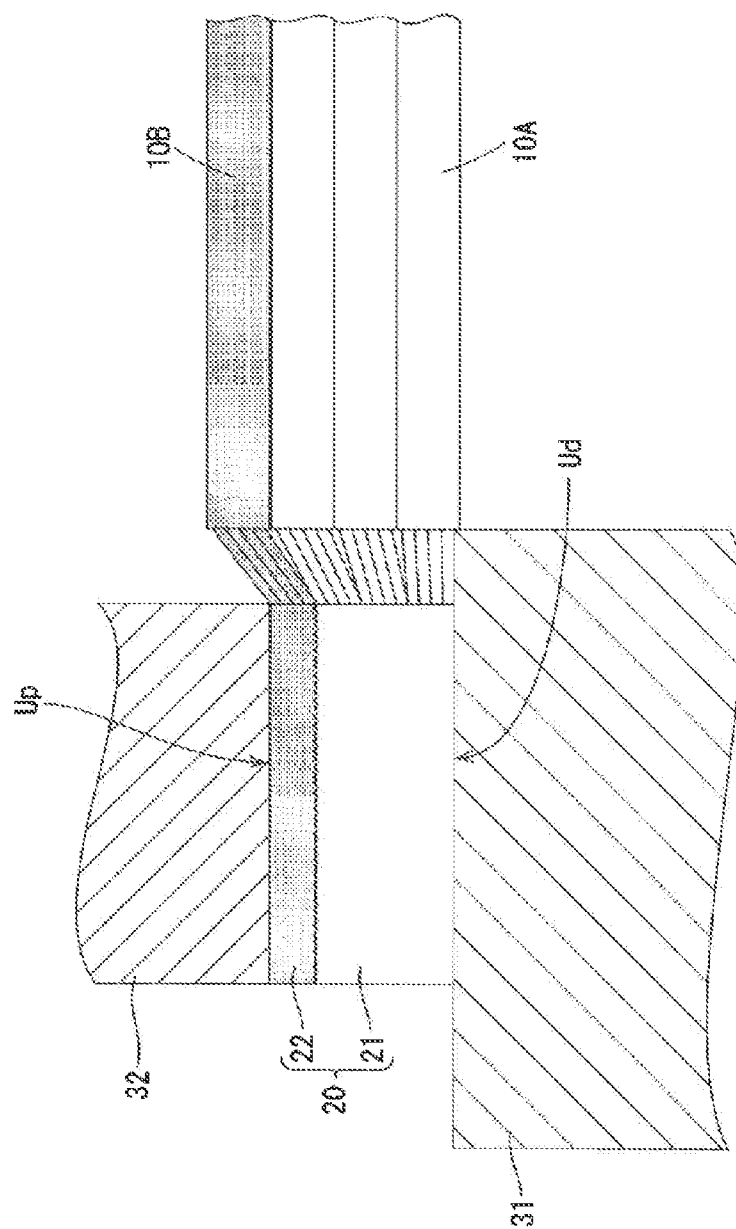
FIG. 3 is a side view showing a state where the first and second core exposed portions are bonded by the ultrasonic welding machine.
Figure 4:
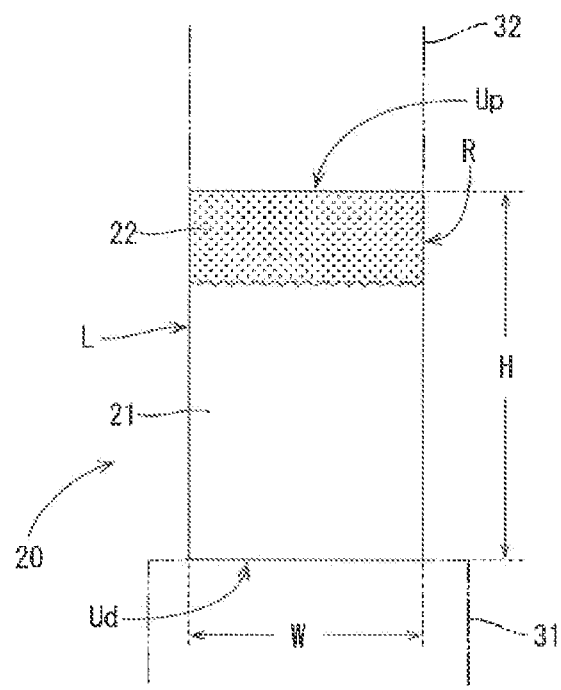
FIG. 4 is a front view of a bonded portion in the embodiment.

As shown in FIGS. 3 and 4, a welded part (bonded portion 20) of the plurality of first core exposed portions 11AE and the plurality of second core exposed portions 11BE has two pairs of outer surfaces (upper surface Up and lower surface Ud, and right side surface R and left side surface L) extending along an extending direction of the first and second wires 10A, 10B and facing each other. As shown in FIG. 4, a distance H between one pair of the outer surfaces (upper surface Up and lower surface Ud), out of the two pairs of outer surfaces, is longer than a distance W between the other pair of outer surfaces (right side surface R and left side surface L). As shown in FIG. 1, the bonded portion 20 is divided into a first layer 21 constituted by the first core exposed portions 11AE and a second layer 22 arranged to overlap on the first layer 21 and constituted by the second core exposed portions 11BE, and the second layer 22, i.e. the layer constituted by the second core exposed portions 11BE, is located adjacent to the upper surface Up as shown in FIG. 4.

An example of a method for manufacturing the harness 1 having the above configuration by connecting the plurality of first wires 10A and the plurality of second wires 10B is described below.

First, the first insulation coating 12A is stripped to expose the first core 11A in the end part of each of the plurality of first wires 10A. The second insulation coating 12B is similarly stripped to expose the second core 11B in the end part also for each of the plurality of second wires 10B (exposing step).

Subsequently, parts where the first and second cores 11A, 11B are exposed in the exposing step (first core exposed portions 11AE, second core exposed portions 11BE) are bundled and bonded by ultrasonic welding (bonding step).

Figure 2:
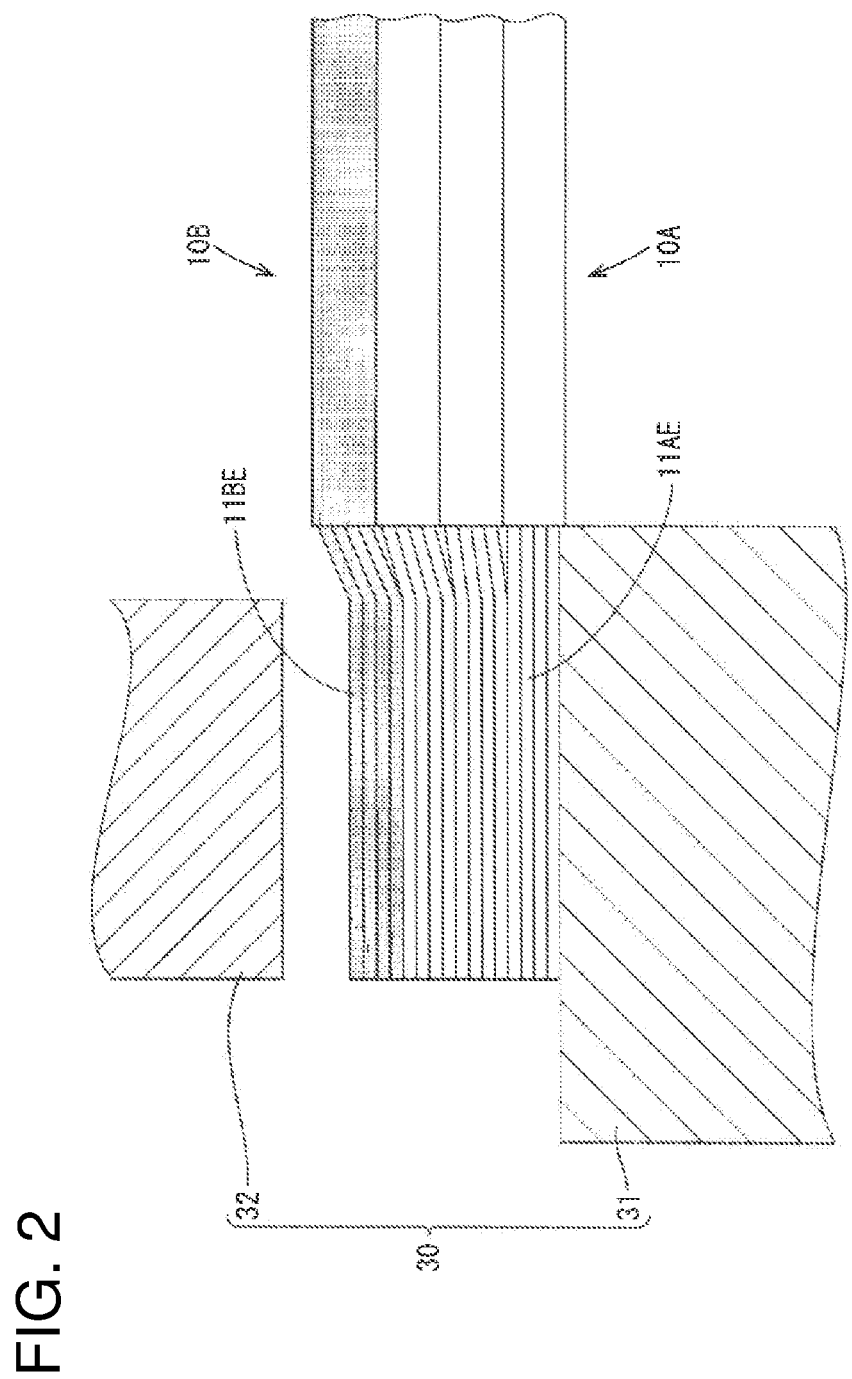
FIG. 2 is a side view showing a state where first core exposed portions and second core exposed portions are set in an ultrasonic welding machine in the embodiment.

As shown in FIG. 2, the first core exposed portions 11AE and the second core exposed portions 11BE are placed on an anvil 31 (equivalent to a receiving jig) of an ultrasonic welding machine 30. At this time, the first core exposed portions 11AE having the larger total cross-sectional area A1 are arranged on the side of the anvil (lower side in FIG. 2) and the second core exposed portions 11BE having the smaller total cross-sectional area A2 are arranged on the side of a welding horn 32 (upper side of FIG. 2).

Subsequently, as shown in FIG. 3, the welding horn 32 is lowered and applies ultrasonic vibration along an axial direction of the first and second wires 10A, 10B while pressing the first and second core exposed portions 11AE, 11BE. In this way, the first and second core exposed portions 11AE, 11BE are welded to form the bonded portion 20. Note that welding may be performed under conditions suitable for the welding of aluminum, i.e. conditions in conformity with the material of the first cores 11A having the larger total cross-sectional area A1.

In this welding step, the first core exposed portions 11AE are in contact with the anvil 31 and the second core exposed portions 11BE are in contact with the welding horn 32. Further, in the formed bonded portion 20, the distance H between the lower surface Ud (equivalent to a first contact surface) in contact with the anvil 31 and the upper surface Up (equivalent to a second contact surface) in contact with the welding horn 32 is longer than the distance W between the right and left side surfaces R, L.

As described above, the harness 1 of this embodiment is provided with the first wires 10A each including the first core 11A made of aluminum or aluminum alloy and the first insulation coating 12A covering the first core 11A and having the first core exposed portion 11AE formed by partially exposing the first core 11A from the first insulation coating 12A, the second wires 10B each including the second core 11B made of copper or copper alloy and the second insulation coating 12B covering the second core 11B and having the second core exposed portion 11BE formed by partially exposing the second core 11B from the second insulation coating 12B, and the bonded portion 20 obtained by welding the first core exposed portions 11AE and the second core exposed portions 11BE. The total cross-sectional area A2 of the second cores 11B is equal to or less than ⅓ of the sum of the total cross-sectional areas of the first cores 11A and the second cores 11B. The bonded portion 20 has the two pairs of outer surfaces extending along the extending direction of the first and second wires 10A, 10B and facing each other, the distance H between the one pair of outer surfaces (upper surface Up and lower surface Ud), out of the two pairs of outer surfaces, is longer than the distance W between the other pair of outer surfaces (right side surface R and left side surface L), and the second core exposed portions 11BE are arranged adjacent to the upper surface Up in the bonded portion 20.

Further, the wire connection method of this embodiment is a method for connecting the first wires 10A each including the first core 11A made of aluminum or aluminum alloy and the first insulation coating 12A covering the first core 11A and the second wires 10B each including the second core 11B made of copper or copper alloy and the second insulation coating 12B covering the second core 11B, the total cross-sectional area A2 of the second cores 11B is equal to or less than ⅓ of the sum (A1+A2) of the total cross-sectional areas of the first cores 11A and the second cores 11B, and the method includes the exposing step of stripping the first and second insulation coatings 12A, 12B in the end parts of the respective first and second wires 10A, 10B to expose the first and second cores 11A, 11B, and the welding step of ultrasonically welding the parts of the first and second cores 11A, 11B exposed in the exposing step (first and second core exposed portions 11AE, 11BE) to form the bonded portion 20 by the ultrasonic welding machine 30 including the welding horn 32 and the anvil 31. In the welding step, welding is performed with the first cores 11AB held in contact with the anvil 31 and the second cores 11B held in contact with the welding horn 32. In the bonded portion 20, the distance H between the lower surface Ud in contact with the anvil 31 and the upper surface Up in contact with the welding horn 32 is longer than the distance W between the pair of outer surfaces (right and left side surfaces R, L) different from the upper and lower surfaces Ud, Up.

According to the above configuration, the second core exposed portions 11BE are arranged adjacent to the upper surface Up of the bonded portion 20. Here, since the distance H between the one pair of outer surfaces (upper and lower surfaces Up, Ud), out of the two pairs of outer surfaces, is longer than the distance W between the other pair of outer surfaces (right and left side surfaces R, L) in the bonded portion 20, a width of the upper and lower surfaces Up, Ud (distance between the right and left ends of FIG. 4) is shorter than a width of the right and left side surfaces R, L (distance between the upper and lower ends of FIG. 4). If the second core exposed portions 11BE having the smaller total cross-sectional area A2 are arranged adjacent to the right or left side surface R, L having a wider width, the arrangement of the second core exposed portions 11BE changes at every welding and a variation of welding strength becomes larger. In contrast, by arranging the second core exposed portions 11BE having the smaller total cross-sectional area A2 adjacent to the upper surface Up having a narrower width, the variation of welding strength can be reduced and the peeling of a bonded part can be suppressed.

Such an arrangement of the second core exposed portions 11BE is effective when a difference between the total cross-sectional area A1 of the first cores 11A and the total cross-sectional area A2 of the second cores 11B is large, and particularly effective when the total cross-sectional area A2 of the second cores 11B is equal to or less than ⅓ of the sum (A1+A2) of the total cross-sectional areas of the first cores 11A and the second cores 11B.

Further, the bonded portion 20 includes the first layer 21 constituted by the first core exposed portions 11AE and the second layer 22 adjacent to the first layer 21 and constituted by the second core exposed portions 11BE. If a part constituted by the first core exposed portions 11AE and a part constituted by the second core exposed portions 11BE are divided into two layers in the bonded portion 20 in this way, the variation of welding strength can be further suppressed and the peeling of the bonded part can be suppressed.

<First Modification>

As in the embodiment, a harness 40 of a first modification includes a part (bonded portion 41) obtained by welding the first core exposed portions 11AE and the second core exposed portions 11BE. As in the embodiment, the distance H between the one pair of outer surfaces (upper and lower surfaces Up, Ud) extending along the extending direction of the wires 10A, 10B and facing each other is longer than the distance W between the other pair of outer surfaces (right and left side surfaces R, L) extending along the extending direction of the wires 10A, 10B and facing each other in the bonded portion 41.

Figure 5:
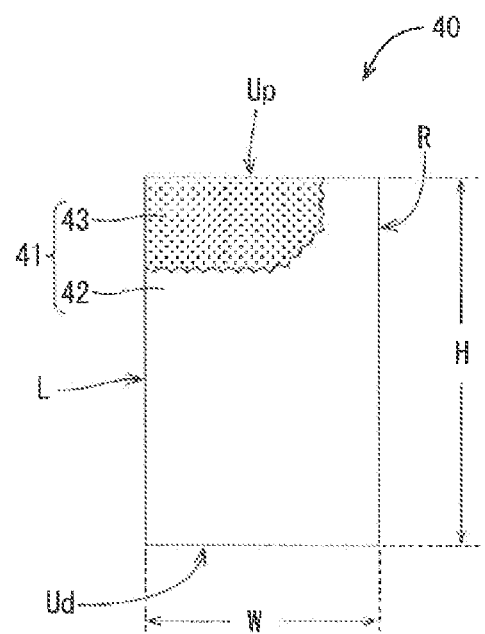
FIG. 5 is a front view of a bonded portion in a first modification.

As shown in FIG. 5, a part of the bonded portion 41 adjacent to one (upper surface Up) of the one pair of outer surfaces (upper and lower surfaces Up, Ud) serves as a second bonded portion 43 constituted by the second core exposed portions 11BE, and a remaining part serves as a first bonded portion 42 constituted by the first core exposed portions 11AE. Since the other configuration is the same as in the embodiment, components similar to those of the embodiment are denoted by the same reference signs and not described.

In this modification, the first and second bonded portions 42, 43 are not completely divided into two layers in the bonded portion 41 unlike in the embodiment. However, since the second bonded portion 43 is arranged adjacent to the upper surface Up having a narrower width, a certain effect of reducing the variation of welding strength and suppressing the peeling of a bonded part is obtained.

<Second Modification>

Figure 6:
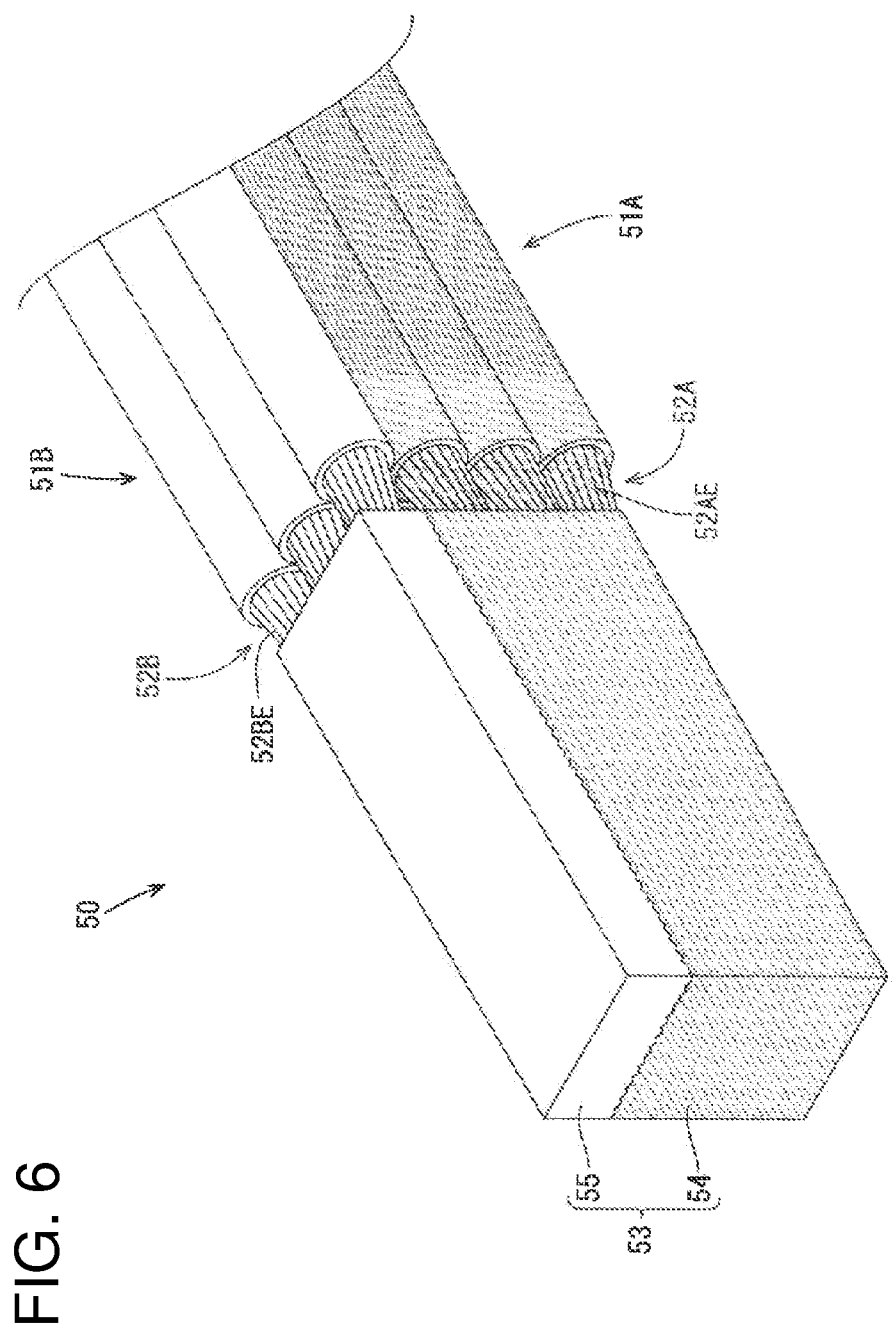
FIG. 6 is a perspective view of a harness of a second modification.

As shown in FIG. 6, a harness 50 of a second modification includes a plurality of first wires 51A and a plurality of second wires 51B. In this modification, contrary to the embodiment, the first wire 51A is a copper wire including a first core 52A made of copper or copper alloy, and the second wire 51B is an aluminum wire including a second core 52B made of aluminum or aluminum alloy. A total cross-sectional area A2 of the second cores 52B is equal to or less than ⅓ of the sum of total cross-sectional areas of the first cores 52A and the second cores 52B.

In manufacturing the harness 50 of this modification, ultrasonic welding may be performed under welding conditions suitable for the welding of copper in the bonding step. However, since a welding temperature of copper is higher than that of aluminum, molten aluminum may adhere to the welding horn 32. Accordingly, the bonding step is preferably performed in two stages as follows.

First, in a first bonding step, only first core exposed portions 52AE are bundled and bonded by ultrasonic welding to first form a first layer 54. At this time, welding may be performed under conditions in conformity with the material of the first cores 52A (conditions suitable for the welding of copper).

Subsequently, in a second bonding step, the first layer 54 formed in the first bonding step is placed on the anvil 31. Subsequently, second core exposed portions 52BE are arranged on the first layer 54 (on the side of the welding horn 32). Then, ultrasonic welding is performed to bond the second core exposed portions 52BE on the first layer 54 and form a second layer 55, whereby a bonded portion 53 is completed. At this time, welding may be performed under conditions in conformity with the material of the second cores 52B (conditions suitable for the welding of aluminum).

Since the other configuration is the same as in the embodiment, components similar to those of the embodiment are denoted by the same reference signs and not described.

<Other Modifications>

Although the plurality of first wires 10A and the plurality of second wires 10B are provided in the above embodiment, one first wire and/or one second wire may be provided. Further, the first and second wires may have different core thicknesses (core cross-sectional areas), the plurality of first wires may include wires having different core thicknesses (core cross-sectional areas), or the plurality of second wires may include wires having different core thicknesses (core cross-sectional areas).

TEST EXAMPLES

[Used Machines, Used Materials]

A "Schunk Mimic 4" produced by Schunk GmbH & Co. KG was used as an ultrasonic welding machine. A "horizontal tensile testing machine: MS-6" produced by Sunmec Co., Ltd. was used as a tensile testing machine.

A wire size was indicated by a cross-sectional area ($mm^2$: sq) of a core (stranded wire).

[Test Method]

1. Test Example 1

1) Fabrication of Test Bodies

Wires shown in Table 1 were respectively cut to a length of 100 mm and insulation coatings of 10 mm on tips are removed to expose cores.

Subsequently, using the ultrasonic welding machine, an exposed part of a copper core was welded under conditions recommended for copper by the ultrasonic welding machine. Subsequently, exposed parts of aluminum cores and the previously fabricated copper core exposed portion solidified by ultrasonic welding were welded to obtain a test body. At this time, the core of the copper wire (core having a smaller total cross-sectional area) was arranged on the side of a welding horn. A width (equivalent to the distance W of the above embodiment) and a height (equivalent to the distance H) of a bonded part are shown in Table 1.

The obtained test bodies were subjected to a tear strength test.

2) Tear Strength Test

Figure 7:
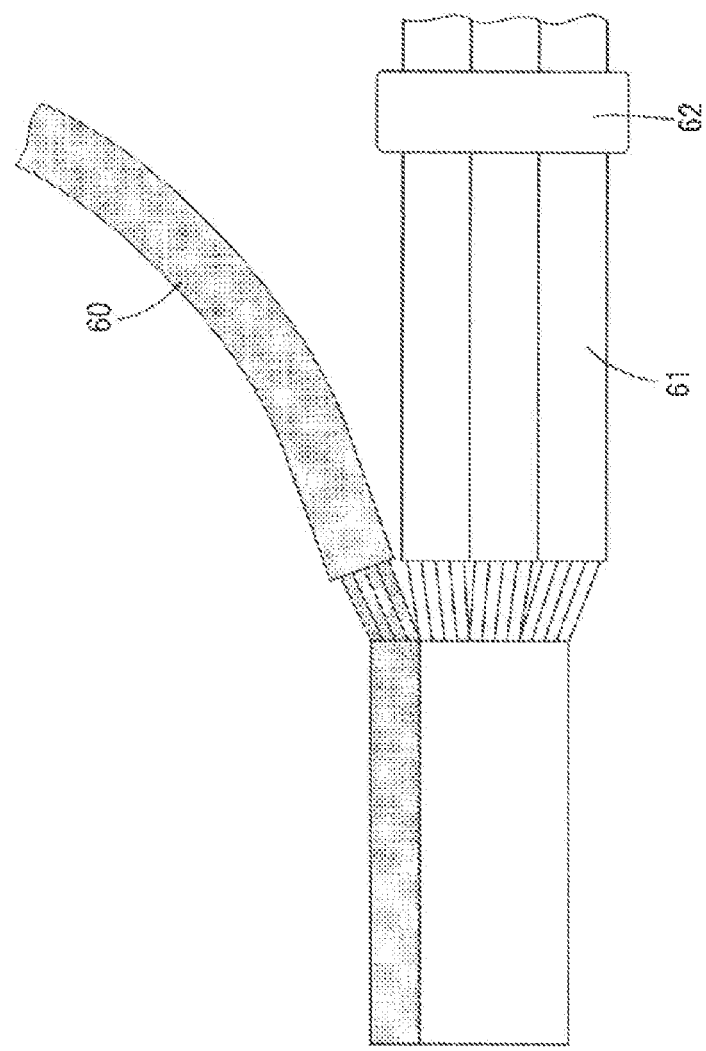
FIG. 7 is a side view schematically showing a state of a tear test in a test example.

Using the tensile testing machine, one copper wire 60 was pulled at 100 mm/min and a maximum load until a bonded part was torn was measured with other wires 61 fixed by a fixing tool 62 as shown in FIG. 7. Five testing bodies were tested and an average value of the maximum loads was set as tear strength. A result is shown in Table 1.

2. Test Example 2

Using wires shown in Table 2, test bodies were fabricated as in Test Example 1 and a tear strength test was conducted. A result is shown in Table 2.

3. Test Example 3

Using wires shown in Table 3, test bodies were fabricated as in Test Example 1 and a tear strength test was conducted. A result is shown in Table 3.

4. Test Example 4

Using wires shown in Table 4, test bodies were fabricated as in Test Example 1 and a tear strength test was conducted. A result is shown in Table 4.

5. Test Example 5

Using wires shown in Table 5, test bodies were fabricated. A core of an aluminum wire (core having a smaller total cross-sectional area) was arranged on the welding horn side under conditions recommended for copper by the welding machine. Other fabrication conditions were the same as in Test Example 1.

A tear strength test was conducted as in Test Example 1 for the obtained test bodies. A result is shown in Table 5.

6. Test Example 6

Using wires shown in Table 6, test bodies were fabricated as in Test Example 1 and a tear strength test was conducted. A result is shown in Table 6.

TABLE 1

| Core Type | Cross-Sectional Area ($mm^2$) | Number | Total Cross-sectional Area ($mm^2$) |
|---|---|---|---|
| Copper | 0.75 | 1 | 0.75 |
| Aluminum | 0.75 | 2 | |
| Aluminum | 1.25 | 1 | 7.75 |
| Aluminum | 2.5 | 2 | |

| Bonded Part | |
|---|---|
| Width (mm) | 2.85 |
| Height (mm) | 3.15 |

| Tear Strength | | |
|---|---|---|
| Test Body No. | Coper (N) | Aluminum (N) |
| 1 | 30.0 | 30.2 |
| 2 | 30.0 | 34.8 |
| 3 | 29.8 | 33.9 |
| 4 | 29.1 | 34.1 |
| 5 | 33.0 | 29.2 |
| Average | 30.38 | 32.44 |

TABLE 2

| Core Type | Cross-Sectional Area ($mm^2$) | Number | Total Cross-sectional Area ($mm^2$) |
|---|---|---|---|
| Copper | 0.35 | 1 | 0.35 |
| Aluminum | 0.5 | 1 | |
| Aluminum | 0.75 | 1 | 1.25 |

| Bonded Part | |
|---|---|
| Width (mm) | 0.9 |
| Height (mm) | 1.42 |

| Tear Strength | | |
|---|---|---|
| Test Body No. | Coper (N) | Aluminum (N) |
| 1 | 27.9 | 21.1 |
| 2 | 33.6 | 20.4 |
| 3 | 26.4 | 20.9 |
| 4 | 31.3 | 23.6 |
| 5 | 22.4 | 19.8 |
| Average | 28.32 | 21.16 |

TABLE 3

| Core Type | Cross-Sectional Area ($mm^2$) | Number | Total Cross-sectional Area ($mm^2$) |
|---|---|---|---|
| Copper | 0.35 | 1 | 0.35 |
| Aluminum | 0.5 | 5 | |
| Aluminum | 0.75 | 3 | 4.75 |

| Bonded Part | |
|---|---|
| Width (mm) | 0.9 |
| Height (mm) | 3.08 |

TABLE 3-continued

| | Tear Strength | |
|---|---|---|
| Test Body No. | Coper (N) | Aluminum (N) |
| 1 | 27.1 | 31.8 |
| 2 | 26.4 | 32.5 |
| 3 | 22.0 | 29.0 |
| 4 | 32.7 | 34.9 |
| 5 | 21.8 | 29.3 |
| Average | 26 | 31.5 |

TABLE 4

| Core Type | Cross-Sectional Area (mm$^2$) | Number | Total Cross-sectional Area (mm$^2$) |
|---|---|---|---|
| Copper | 0.3 | 1 | 0.3 |
| Aluminum | 0.75 | 9 | 6.75 |

| Bonded Part | |
|---|---|
| Width (mm) | 1.2 |
| Height (mm) | 3.6 |

| | Tear Strength | |
|---|---|---|
| Test Body No. | Coper (N) | Aluminum (N) |
| 1 | 33.9 | 30.4 |
| 2 | 23.2 | 31.1 |
| 3 | 26.5 | 30.9 |
| 4 | 28.6 | 33.0 |
| 5 | 28.3 | 32.7 |
| Average | 28.1 | 31.62 |

TABLE 5

| Core Type | Cross-Sectional Area (mm$^2$) | Number | Total Cross-sectional Area (mm$^2$) |
|---|---|---|---|
| Copper | 0.3 | 15 | 4.5 |
| Aluminum | 0.5 | 1 | 0.5 |

| Bonded Part | |
|---|---|
| Width (mm) | 1.2 |
| Height (mm) | 3.84 |

| | Tear Strength | |
|---|---|---|
| Test Body No. | Coper (N) | Aluminum (N) |
| 1 | 33.7 | 27.6 |
| 2 | 33.1 | 25.8 |
| 3 | 35.7 | 29.2 |
| 4 | 33.9 | 27.4 |
| 5 | 33.3 | 30.6 |
| Average | 33.94 | 28.12 |

TABLE 6

| Core Type | Cross-Sectional Area (mm$^2$) | Number | Total Cross-sectional Area (mm$^2$) |
|---|---|---|---|
| Copper | 0.3 | 1 | 0.3 |
| Aluminum | 0.5 | 11 | 5.5 |

TABLE 6-continued

| Bonded Part | |
|---|---|
| Width (mm) | 1.2 |
| Height (mm) | 3.43 |

| | Tear Strength | |
|---|---|---|
| Test Body No. | Coper (N) | Aluminum (N) |
| 1 | 40.1 | 45.7 |
| 2 | 31.0 | 45.0 |
| 3 | 28.1 | 31.2 |
| 4 | 40.1 | 44.1 |
| 5 | 38.8 | 24.3 |
| Average | 35.62 | 38.06 |

[Result]

As shown in Table 1, in Test Example 1, a high tear strength was exhibited both in the case of pulling the copper wire and in the case of pulling the aluminum wires and it was found that two types of the cores were firmly bonded in the bonded part. The same holds true for the other test examples.

LIST OF REFERENCE NUMERALS

1, 40, 50 . . . harness
10A, 51A . . . first wire
10B, 51B . . . second wire
11A, 52A . . . first core
11B, 52B . . . second core
11AE, 52AE . . . first core exposed portion
11BE, 52BE . . . second core exposed portion
12A . . . first insulation coating
12B . . . second insulation coating
20, 41, 53 . . . bonded portion
21, 54 . . . first layer
22, 55 . . . second layer
30 . . . ultrasonic welding machine
31 . . . anvil (receiving jig)
32 . . . welding horn
L . . . left side surface (outer surface constituting another pair)
R . . . right side surface (outer surface constituting another pair)
Up . . . upper surface (outer surface constituting one pair, second contact surface)
Ud . . . lower surface (outer surface constituting one pair, first contact surface)

What is claimed is:

1. A wire connection structure, comprising:
   one or more first wires each including a first core and a first insulation coating covering the first core and having a first core exposed portion formed by partially exposing the first core from the first insulation coating;
   one or more second wires each including a second core made of a material different from that of the first core and a second insulation coating covering the second core and having a second core exposed portion formed by partially exposing the second core from the second insulation coating; and
   a bonded portion formed by welding the first core exposed portion(s) and the second core exposed portion(s), wherein:
   a total cross-sectional area of the second core(s) is equal to or less than ⅓ of the sum of total cross-sectional areas of the first core(s) and the second core(s), the bonded portion has two pairs of outer surfaces extending along an extending direction of the first and second wires and facing each other and a distance between one pair of the outer surfaces, out of the two pairs of outer surfaces, is longer than a distance between another pair of the outer surfaces, and the second core exposed portion(s) is/are arranged adjacent to one outer surface, out of the one pair of outer surfaces, in the bonded portion, and the second core exposed portion(s) does/do not contact the other outer surface, out of the one pair of the outer surfaces, in the bonded portion.

2. The wire connection structure according to claim 1, wherein either one(s) of the first core(s) and the second core(s) is/are made of aluminum or aluminum alloy.

3. The wire connection structure according to claim 2, wherein the other(s) of the first core(s) and the second core(s) is/are made of copper or copper alloy.

4. The wire connection structure according to claim 1, wherein the bonded portion includes a first layer constituted by the first core exposed portion(s) and a second layer adjacent to the first layer and constituted by the second core exposed portion(s).

5. The wire connection structure according to claim 1, wherein in a cross-section taken perpendicular to the extending direction of the first and second wires, a total length of the second core exposed portion(s) along one of the another pair of the outer surfaces in the bonded portion is less than the distance between the one pair of the outer surfaces of the bonded portion.

6. The wire connection structure according to claim 1, wherein in a cross-section taken perpendicular to the extending direction of the first and second wires, a total length of the second core exposed portion(s) along one of the another pair of the outer surfaces in the bonded portion is less than a total length of the second core exposed portion(s) along one of the one pair of the outer surfaces in the bonded portion.

7. A wire connection method comprising:
preparing one or more first wires each including a first core and a first insulation coating covering the first core and one or more second wires each including a second core made of a material different from that of the first core and a second insulation coating covering the second core, a total cross-sectional area of the second core(s) being equal to or less than ⅓ of the sum of total cross-sectional areas of the first core(s) and the second core(s);

an exposing step of stripping the first insulation coating and the second insulation coating in parts of each first wire and each second core to expose the first core and the second core; and a welding step of ultrasonically welding parts of the first core(s) and the second core(s) exposed in the exposing step to form a bonded portion by an ultrasonic welding machine including a welding horn and a receiving jig, wherein, in the welding step, welding is performed with the first core(s) held in contact with the receiving jig and the second core(s) held in contact with the welding horn, and a distance between a first contact surface in contact with the receiving jig and a second contact surface in contact with the welding horn is longer than a distance between one pair of outer surfaces different from the first and second contact surfaces in the bonded portion, and the second core(s) does/do not contact the first contact surface.

8. The wire connection method according to claim 7, wherein in a cross-section taken perpendicular to an extending direction of the first and second wires, a total length of the second core(s) along one of the one pair of outer surfaces different from the first and second contact surfaces in the bonded portion is less than the distance between the first and second contact surfaces in the bonded portion.

9. The wire connection method according to claim 7, wherein in a cross-section taken perpendicular to an extending direction of the first and second wires, a total length of the second core(s) along one of the one pair of outer surfaces different from the first and second contact surfaces in the bonded portion is less than a total length of the second core(s) along the second contact surface in the bonded portion.

* * * * *